United States Patent
Hamanaka

(10) Patent No.: US 6,907,162 B2
(45) Date of Patent: Jun. 14, 2005

(54) OPTICAL MODULE UNIT AND OPTICAL MODULE EMPLOYING THE OPTICAL MODULE UNIT

(75) Inventor: Kenjiro Hamanaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 281 days.

(21) Appl. No.: 10/210,657

(22) Filed: Jul. 31, 2002

(65) Prior Publication Data

US 2003/0026538 A1 Feb. 6, 2003

(30) Foreign Application Priority Data

Jul. 31, 2001 (JP) ........................................ 2001-231585

(51) Int. Cl.$^7$ ............................. G02B 6/32; H04J 14/02
(52) U.S. Cl. ............................. 385/33; 385/31; 385/74; 385/93; 385/88; 385/37; 398/87; 398/88
(58) Field of Search ............................. 385/31, 33, 34, 385/37, 88, 92, 93, 94, 74; 398/87, 88

(56) References Cited

U.S. PATENT DOCUMENTS

| | | | | |
|---|---|---|---|---|
| 4,531,810 A | * | 7/1985 | Carlsen | ...................... 385/137 |
| 4,925,267 A | * | 5/1990 | Plummer et al. | .............. 385/74 |
| 6,167,174 A | * | 12/2000 | Zhang et al. | .................. 385/33 |
| 6,563,976 B1 | * | 5/2003 | Grann et al. | ................... 385/24 |
| 2002/0097960 A1 | * | 7/2002 | Greenway et al. | ............. 385/36 |
| 2002/0131701 A1 | * | 9/2002 | Zhu | ............................. 385/33 |
| 2003/0112522 A1 | * | 6/2003 | Fujimoto | ..................... 359/619 |

FOREIGN PATENT DOCUMENTS

JP          2001-142102          5/2001          ............... 385/33 X

* cited by examiner

*Primary Examiner*—Brian M. Healy
(74) *Attorney, Agent, or Firm*—Merchant & Gould P.C.

(57) ABSTRACT

An optical module 31 is provided in which a wavelength division element 32 such as an optical multi-layer film or diffraction grating is united between the sides of lens blocks 3 of optical module units 1 and 6 opposed to optical fiber blocks 2. Only light with a wavelength $\lambda i$ among light (wavelength components: $\lambda 1, \lambda 2 \ldots \lambda n$) from an optical fiber 41 is transmitted through the wavelength division element 32 and enters an optical fiber 42 of the optical module unit 6. On the other hand, the light (wavelength components: $\lambda 1, \lambda 2 \ldots \lambda n - \lambda i$) reflected at the wavelength division element 32 is taken out of an optical fiber 43 of the optical module unit 1.

17 Claims, 6 Drawing Sheets

(a)          (b)

OPTICAL MODULE UNIT AND OPTICAL MODULE EMPLOYING THE OPTICAL MODULE UNIT

BACKGROUND OF THE INVENTION

1. Field of the Invention

The present invention relates to an optical module such as an optical branching filter or a light switch in WDM communication and an optical module unit forming the optical module.

2. Description of the Prior Art

A schematic structure of an optical branching filter for use in WDM communication disclosed in Japanese Unexamined Patent Publication No. 2001-142102 and the like is shown in FIG. 8. An outgoing light from an outgoing side optical fiber 100 is collimated by a lens 101 to have parallel light. This parallel light is then sent to a branching filter 102. Only light with a wavelength of $\lambda i$ is transmitted through the branching filter 102. The transmitted light with the wavelength $\lambda i$ is then condensed by a lens 103 and enters an incoming side optical fiber 104. The light with remaining wavelength ($\lambda 1$, $\lambda 2 \ldots \lambda n-\lambda i$) reflected at the branching filter 102 returns again to the outgoing side optical fiber 100 through the lens 101.

FIG. 8 shows a principle of structure. Practically, as shown in FIG. 9, it is necessary to cause the light ($\lambda 1, \lambda 2 \ldots \lambda n-\lambda i$) with remaining wavelength reflected at the branching filter 102 to enter the other optical fiber 105 and take it out. In this case, it is not possible to hold optical fibers 100, 104 and 105 at right angles to optical fiber blocks 106, 107. Thus, the optical fibers 100, 104, and 105 must be inserted obliquely into the optical fiber blocks 106, 107.

Obliquely inserting the optical fibers into the optical fiber blocks makes the assembly difficult and no adjustment can be made.

Now, as shown in FIG. 10, it has also been considered to hold the optical fibers 100, 104 and 105 perpendicular to the optical fiber blocks 106, 107 by employing refractive index distribution type rod lenses 108, 109.

By employing the refractive index distribution type rod lens, it is possible to make all the optical axes of optical fibers parallel, but in the case where there are many input and output, there is a problem that it is difficult to arrange each rod lens precisely.

SUMMARY OF THE INVENTION

It is therefore an object of the present invention to solve the above-mentioned problems and to provide an improved optical module unit and an optical module employing the unit.

To solve the problems, an optical module unit according to the present invention is provided, which comprises a pair of lenses and at least one optical fiber, characterized in that the pair of lenses have the same focal distance and are spaced apart by the focal distance on a common optical axis to face each other, and that the optical fiber is provided on one side of the pair of lenses.

Another optical module unit according to the present invention is provided, which comprises a plurality pairs of lenses and at least one optical fiber corresponding to each pair of lenses, characterized in that the pair of lenses have the same focal distance and are spaced apart by the focal distance on a common optical axis to face each other, and that the optical fiber is provided on one side of the pair of lenses.

For example, one or two optical fibers are provided for the pair of lenses. However, the number of the optical fibers can be increased.

Further, the optical fiber is held by an optical fiber block and the pair of lenses are provided on the opposed surfaces of the lens block, wherein the optical fiber block and the lens block can be united to provide an integrated optical module unit which is superior in handling.

Still further, in the opposed surfaces of the lens block where lenses are formed, the surface of the lens block opposed to the side to which the optical fiber is united is not perpendicular to the optical axis, but inclined thereto. In this manner, it is possible to prevent the reflected light from returning to the outgoing optical fiber.

The lens includes a refractive index distribution type lens with refractive index distribution of a substantially hemispheric shape, a diffraction type lens, a lens formed by filling high refractive index resin into a substantially hemispheric depression provided on the lens block, or a lens by a 2 photopolymer molding method (i.e., the method whereby ultraviolet-curing resin in an uncured state is press-molded into a convex lens shape using a stamper, then ultraviolet is irradiated on the uncured ultraviolet-curing resin for curing).

It is desirable that at least one of the opposed lenses is provided with an off-axis aberration correcting means. The off-axis aberration correcting means includes an astigmatism application means for denying the astigmatism or making the lens oval when the lens is seen from the optical axis direction.

An optical module employing the optical module unit is constructed in such a manner that a pair of optical module units is provided and an optically functional member is disposed between these optical module units. The optically functional member includes a wavelength division element such as an optical multi-layer film or diffraction grating and a switch element such as a laminated film of which the refractive index is electrically changed.

The optical module (i.e., an optical distributor) can be constructed by providing the diffraction grating on the surface of one optical module unit opposed to the side to which an optical fiber is connected.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
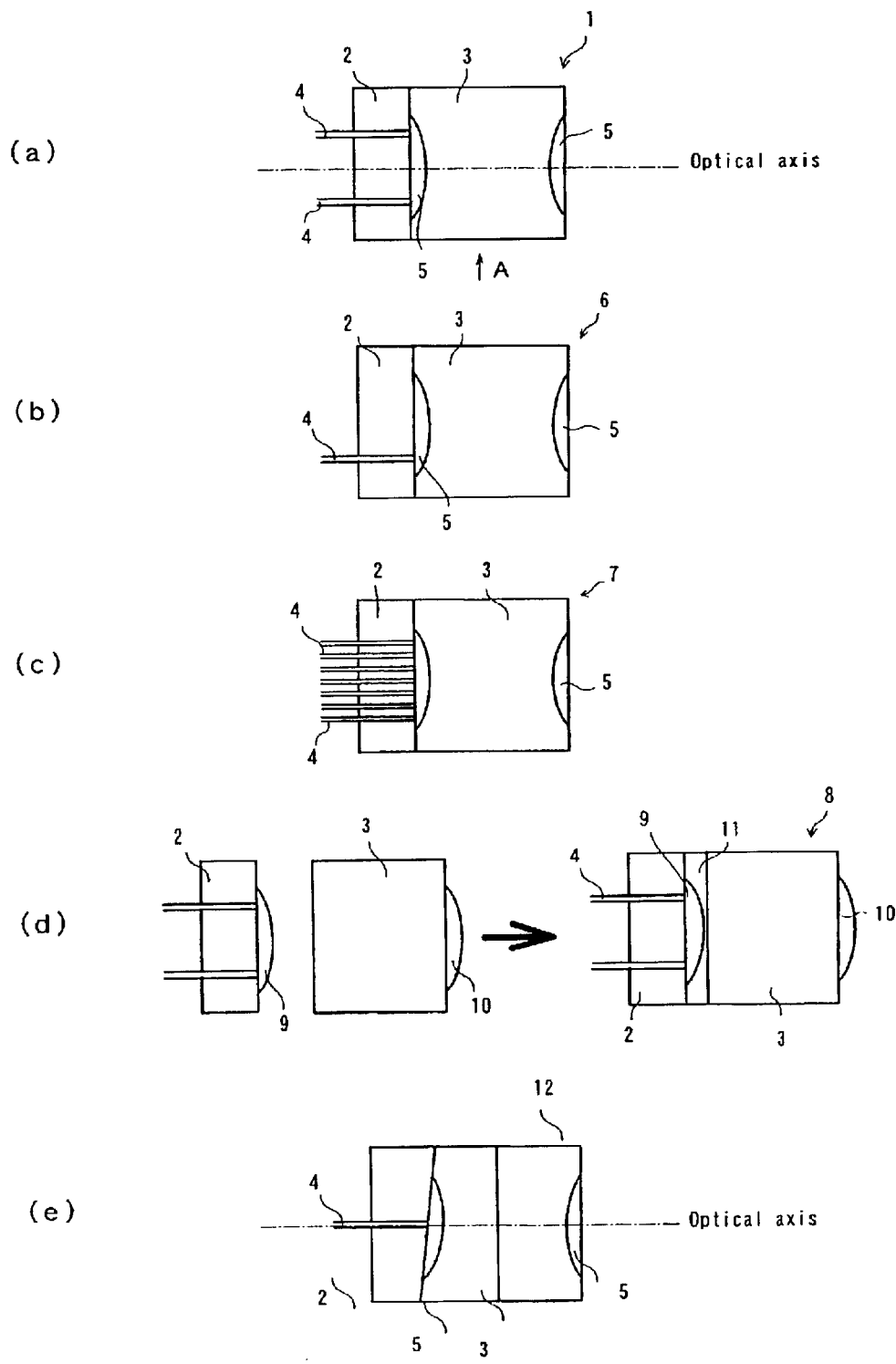
FIGS. 1(a)–(e) are views showing types in which a pair of lenses are provided in optical module units according to the present invention.

Preferred embodiments of the present invention will now be described with reference with the accompanying drawings. FIG. 1(a)~(e) are views showing types in which a pair of lenses is provided in an optical module unit according to the present invention. The optical module unit 1 shown in FIG. 1(a) consists of an optical fiber block 2 and a lens block 3. Two optical fibers 4, 4 are inserted into the optical fiber block 2 parallel to an optical axis, while lenses 5, 5 are provided on the opposite sides of the lens block 3. The lenses 5, 5 have the optical axis in common and have the same focal distance f. The lenses 5, 5 are also spaced away from each other by the focal distance f. The optical fiber block 2 and the lens block 3 are united together to provide the optical module unit 1. When they are united, two optical fibers 4, 4 are spaced away to have the same distance relative to the optical axis.

In assembling the optical module unit 1, when a reflection film or subsequently a branching filter is attached to a side of the lens block 3 opposite to the side to which the optical fiber block 2 is united, the branching filter can also be attached in advance.

Then, the optical fiber block 2 is pressed against the surface of the lens block 3 to which the optical fiber block 2 is united, wherein light is caused to enter from one of the optical fibers 4. The position of the optical fiber block 2 and the lens block 3 is adjusted and united so that intensity of the outgoing light becomes strongest or highest when the incident light outgoes from the other optical fiber 4.

The lenses 5, 5 are formed by ion diffusion to provide refractive index distribution of a substantially hemispheric shape or formed by providing the lens block 3 with a depression of a substantially hemispheric shape by etching and filling resin of high refractive index into the depression.

In an optical module unit 6 shown in FIG. 1(b), one optical fiber 4 is inserted into the optical fiber block 2, while in an optical module unit 7 shown in FIG. 1(c), seven optical fibers 4 are inserted into the optical fiber block 2. In this manner, the number of the optical fibers 4 to be inserted into the optical fiber block 2 is optional. However, in the optical module unit 6 shown in FIG. 1(b), it is to be noted that the optical fiber 4 is spaced away by the same amount as the optical module unit 1 shown in FIG. 1(a) relative to the optical axis.

Referring now to an optical module unit 8 shown in FIG. 1(d), a convex lens 9 made of high refractive index resin is formed on one side of the optical fiber block 2 by a 2 photopolymer molding method. Another convex lens 10 facing the convex lens 9 is also formed on one side of the lens block 3 by the same 2 photopolymer molding method as above. The optical fiber block 2 and the lens block 3 are united by an adhesive agent 11 made of low refractive index resin (which has almost the same refractive index as the lens block 3) to provide the optical module unit 8.

An optical module unit 12 which is shown in FIG. 1(e) is another embodiment in which the optical module unit 1 shown in FIG. 1(a) is seen from the direction A. In this optical module unit 12, a surface of the lens block 3 opposed to a side to which the optical fiber 4 is united is not perpendicular to the optical axis, but inclined thereto so that the reflected light does not return to the outgoing optical fiber 4. In this case, the end surface of the optical fiber 4 is also cut obliquely according to the inclined surface of the lens block 3. In the present embodiment, the lens block 3 is divided into two sections.

Figure 2:
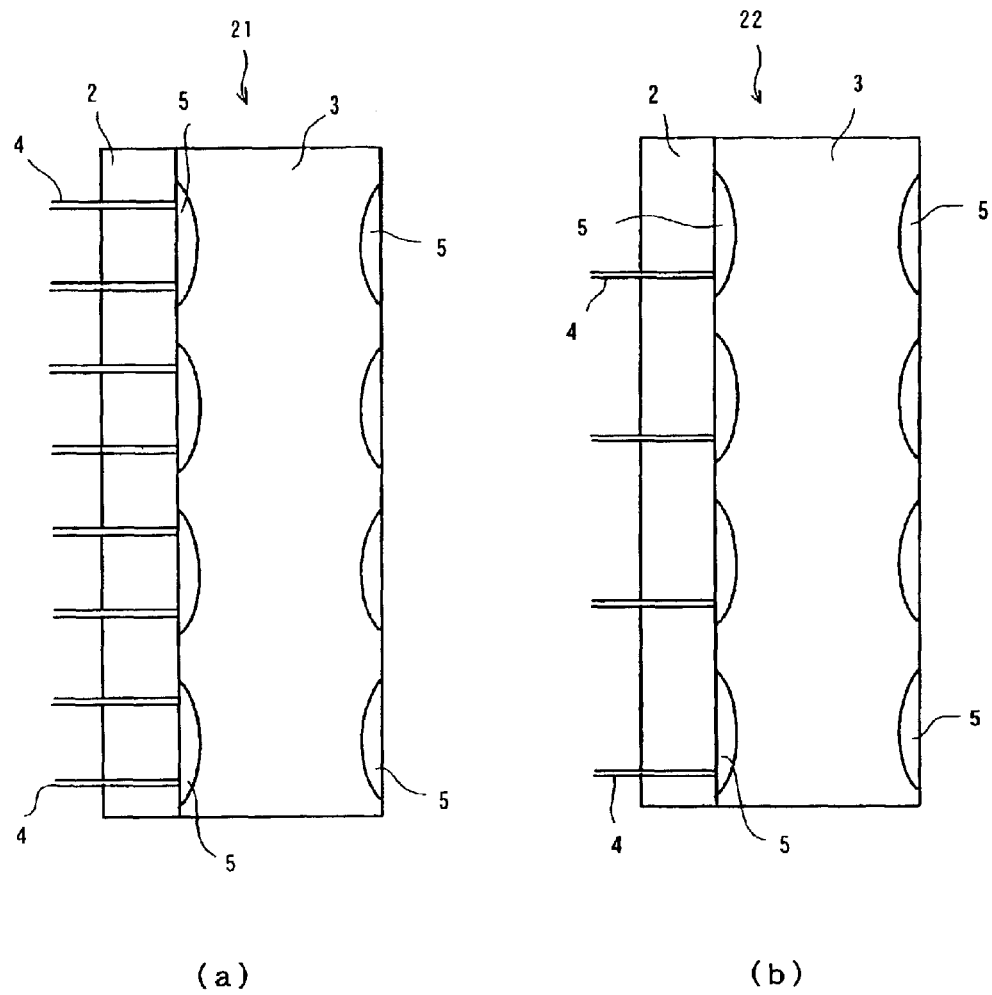
FIGS. 2(a) and (b) are views showing types in which a plurality pairs of lenses are provided in optical module units according to the present invention.

FIGS. 2(a) and (b) are views showing a type in which the plural pairs of lenses are provided in the optical module unit according to the present invention. An optical module unit 21 shown in FIG. 2(a) is a type in which the optical module unit 1 shown in FIG. 1(a) is expanded in a two-dimensional way. The plural pairs of lenses 5, 5 are provided in the lens block 3 and two optical fibers 4, 4 are inserted into the optical fiber block 2 corresponding to each pair of lenses 5.

An optical module unit 22 shown in FIG. 2(b) is a type in which the optical module unit 6 shown in FIG. 1(b) is expanded in a two-dimensional way. One optical fiber 4 is inserted into the optical fiber block 2 corresponding to each pair of lenses 5.

Although not shown here, it is also possible to consider another types in which the optical module units shown in FIG. 1(c)~(e) are expanded in two-dimensional ways.

Figure 3:
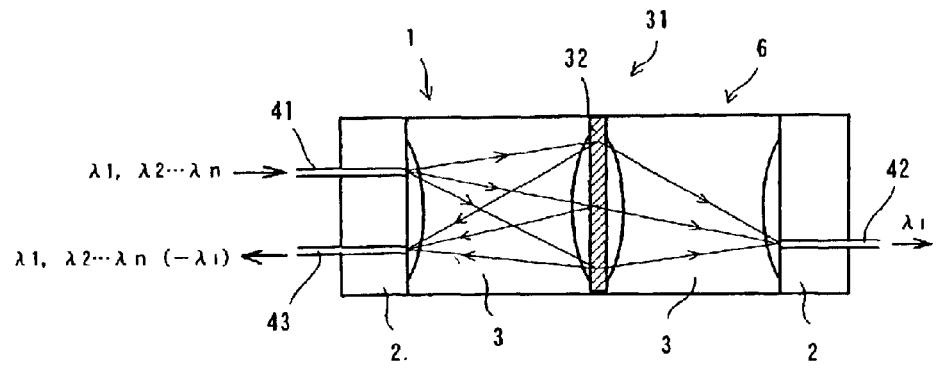
FIG. 3 is a view showing an optical module formed by combining the optical module units shown in FIGS. 1(a) and (b)

FIG. 3 is a view showing an optical module unit 31 which is formed by combining the optical module units shown in FIG. 1(a) and (b). The optical module unit 31 is provided, in which a wavelength division element 32 such as optical multi-layer film or diffraction grating is united between surfaces of the lens blocks 3 of the optical module units 1, 6 opposite to the optical fiber block 2.

In assembling the optical module 31, mutual optical axis of the optical module units 1, 6 is caused to substantially agree in a condition that the wavelength division element 32 is disposed between the lens blocks 3 of the optical module units 1, 6. Then, a position where light from an optical fiber 41 of the optical module unit 1 outgoes at the highest intensity from an optical fiber 42 of the optical module unit 6 is fine controlled. The optical module units 1, 6 are fixedly secured at this position.

According to the optical module 31 shown in FIG. 3, only the light with a wavelength $\lambda i$ among light (wavelength components: $\lambda 1, \lambda 2 \ldots \lambda n$) from the optical fiber 41 of the optical module unit 1 is transmitted through the wavelength division element 32 and enters the optical fiber 42 of the optical module unit 6. On the other hand, light (wavelength components: $\lambda 1, \lambda 2 \ldots \lambda n - \lambda i$) reflected at the wavelength division element 32 is taken out of the optical fiber 43 of the optical module unit 1.

Figure 4:
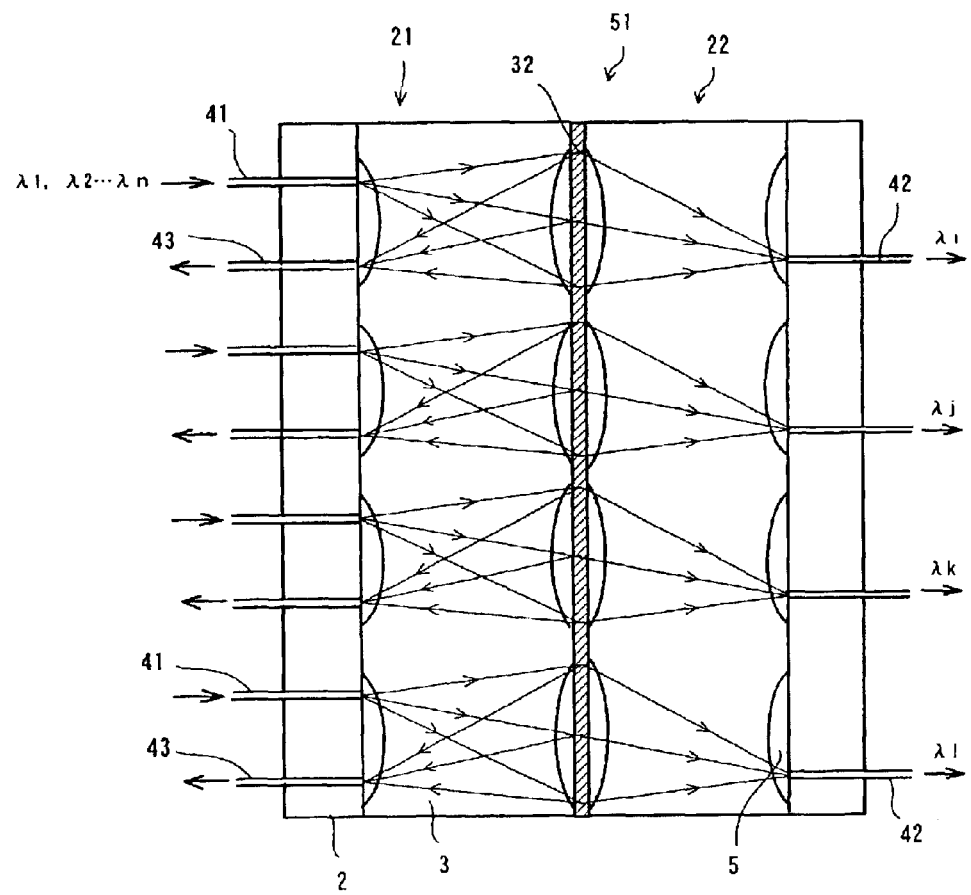
FIG. 4 a view showing an optical module formed by combining the optical module units shown in FIGS. 2(a) and (b)

FIG. 4 shows an optical module 51 obtained by combining the optical module units shown in FIGS. 2(a) and (b). The optical module 51 is provided in which a wavelength division element 32 is united between lens blocks 3 of the optical module units 21, 22 in the same manner as above. Outgoing optical fibers 41 and incoming optical fibers 43 are inserted into the optical fiber block 2 of the optical module unit 21 corresponding to each pair of lenses 5. On the other hand, incoming optical fibers 42 are also inserted into the optical fiber block 2 of the optical module unit 22 corresponding to each pair of lenses 5.

According to the optical module 51 shown in FIG. 4, characteristics of the wavelength division element 32 are caused to change corresponding to each lens so that the light with different wavelength $(\lambda i - \lambda 1)$ can be taken out from each incoming optical fiber 42.

Figure 5:
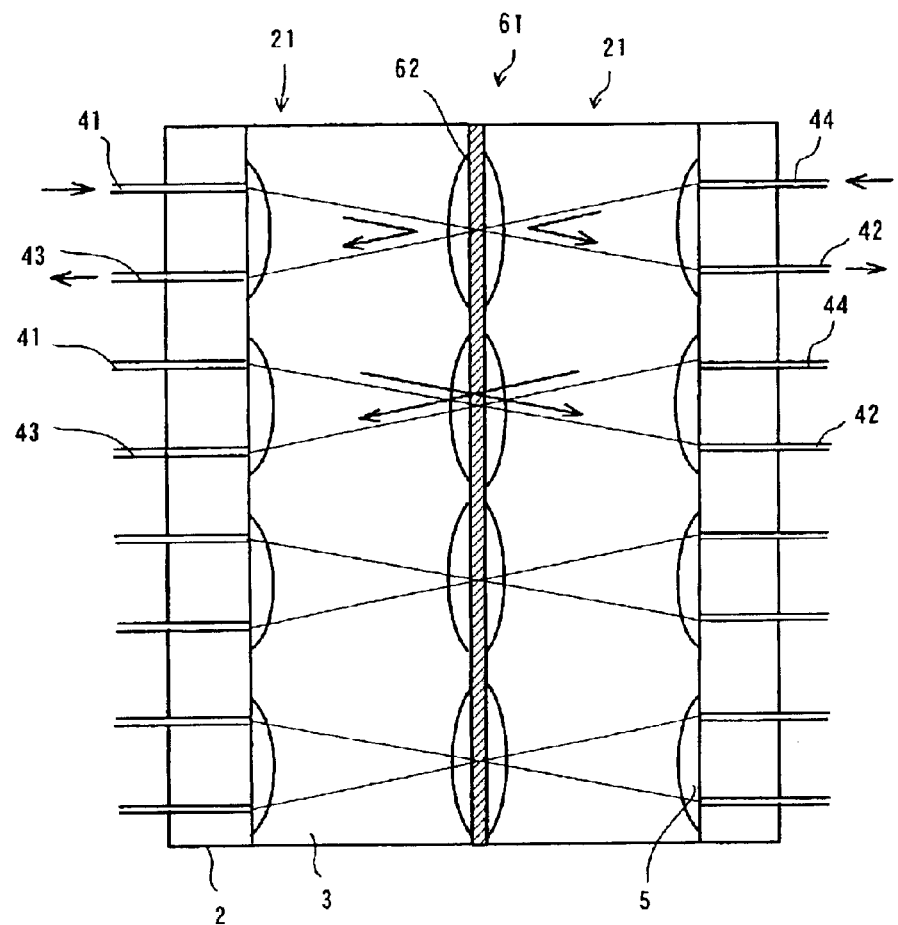
FIG. 5 is a view showing another embodiment of the optical module.

FIG. 5 is a view showing an optical module 61 obtained by combining two optical module units 21 shown in FIG.

2(a). This optical module 61 is provided with reflection/transmission change over switch 62 between the optical module units 21, 21. The reflection/transmission change over switch 62 can use material with an electro-optical effect of which the refractive index is changed by application of voltage.

The uppermost step section of FIG. 5 shows a reflection condition of the switch 62 and the second step section shows a transmission condition of the switch 62. In the case of the reflection condition, the light from the optical fiber 41 enters the optical fiber 43, while the light from the optical fiber 44 enters the optical fiber 42. On the other hand, in the case of the transmission condition, the light from the optical fiber 41 enters the optical fiber 42, while the light from the optical fiber 44 enters the optical fiber 43.

Figure 6:
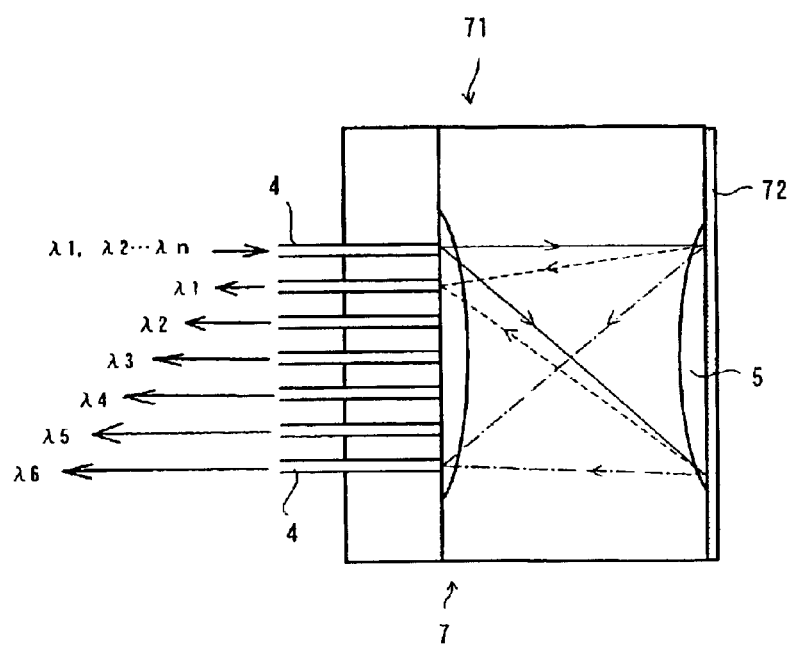
FIG. 6 is a view showing still further embodiment of the optical module.

FIG. 6 is a view showing an optical module 71 in which one optical module unit 7 shown in FIG. 1(c) is used. The optical module 71 is constructed by affixing diffraction grating 72 to an end surface of the lens block 3 on the side of the optical module unit 7 opposite to the optical fiber block 2. This optical module 71 can take out the light of a different wavelength from each optical fiber 4.

The optical system according to the present invention utilizes concentration of light at a position away from an optical axis of the lens. Thus, there is inevitably caused an off-axis aberration. Accordingly, it is desirable that each lens 5 be provided with a means for correcting the off-axis aberration.

Figure 7:
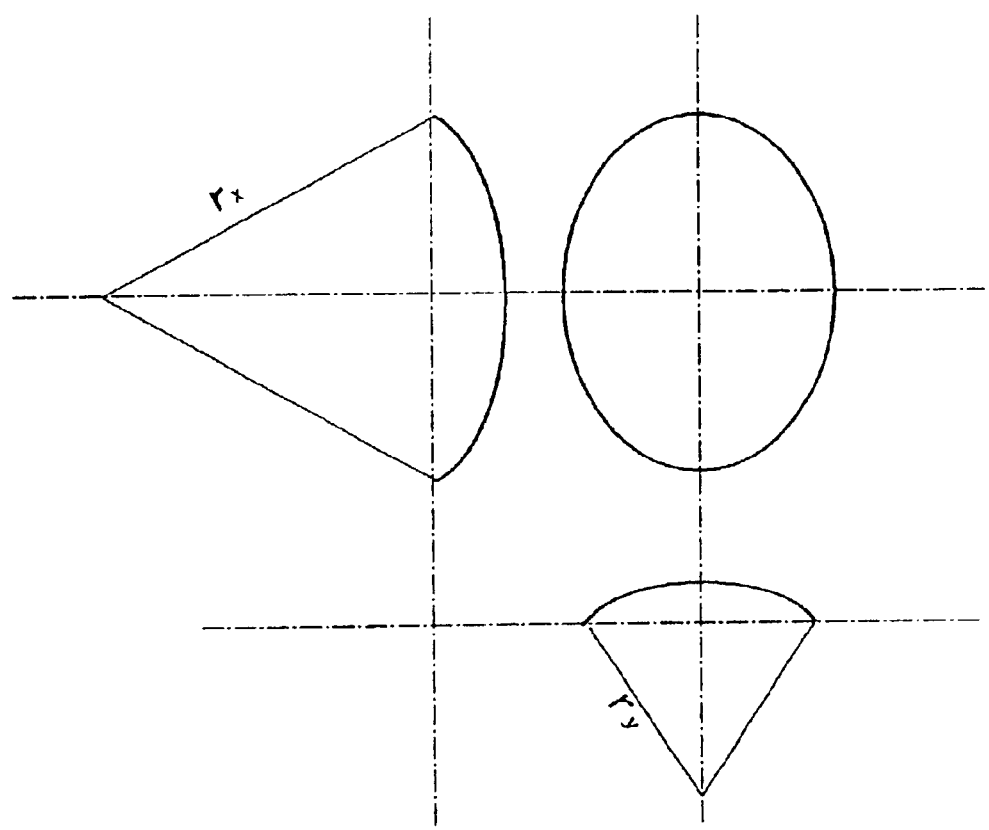
FIG. 7 is a view explaining one example of an off-axis aberration correcting means.
Figure 8:
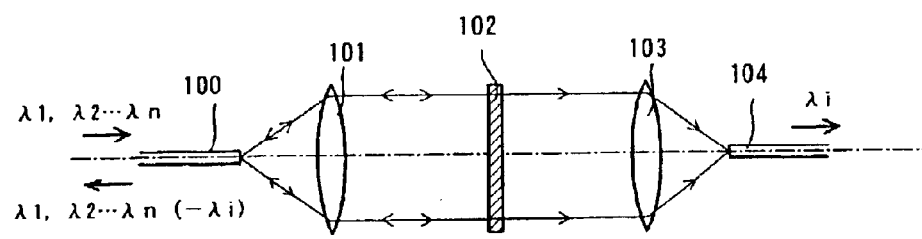
FIG. 8 is a view showing a principle of a conventional optical branching filter.
Figure 9:
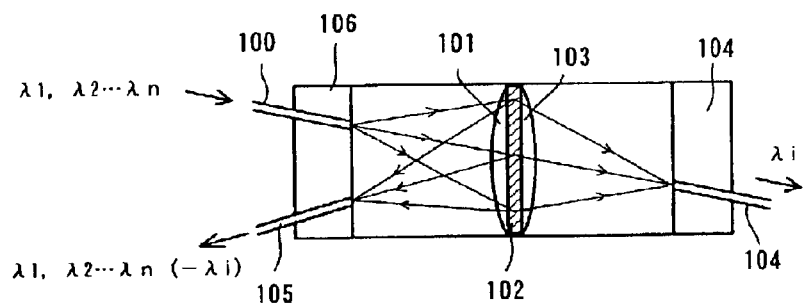
FIG. 9 is a structural view of the conventional optical branching filter.
Figure 10:
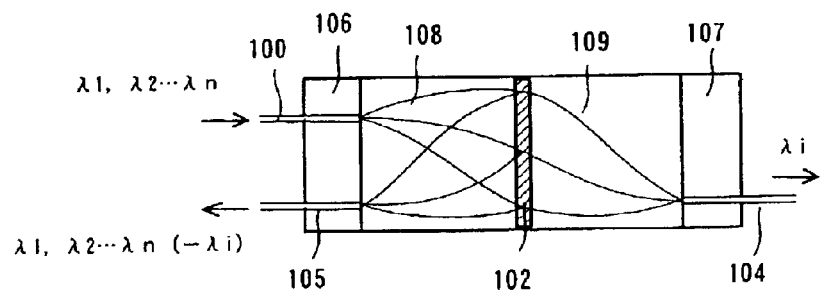
FIG. 10 is a structural view of the conventional branching filter employing a refractive index distribution type rod lens.

The off-axis aberration almost consists of astigmatism. Accordingly, the astigmatism can be corrected by providing the lens with a structure for denying the astigmatism. For example, in the case of a lens of a type in which a glass board or base (i.e., lens block) is provided with a depression into which high refractive index resin is embedded, the depression can be made oval as shown in FIG. 7. Thus, a radius of curvature in the major axis direction and the minor axis direction of this oval can be changed.

As described above, according to the optical module unit according to the present invention, it is possible to make all the optical axis of the optical fibers parallel without using a refractive index distribution type rod lens. Accordingly, an optical module such as an optical branching filter or a light switch used in the optical communication can be easily assembled and adjusted.

Further, even when the number of optical fibers for input and output is increased, it is possible to cause an optical axis of the optical fiber and the lens to precisely coincide with each other.

What is claimed is:

1. An optical module unit comprising a pair of lenses and at least one optical fiber, characterized in that the pair of lenses have the same focal distance and are spaced apart by the focal distance on a common optical axis to face with each other, and that the optical fiber is provided on one side of the pair of lenses.

2. An optical module unit comprising the plural pairs of lenses and at least one optical fiber corresponding to each past of lenses, characterized in that the pair of lenses have the same focal distance and are spaced apart by the focal distance on a common optical axis to face with each other, and that the optical fiber is provided on one side of the pair of lenses.

3. The optical module unit according to claim 1, wherein one or two optical fibers are provided from the pair of lenses and the optical fibers are provided parallel to and spaced apart a predetermined distance from the optical axis.

4. The optical module unit according to claim 1, wherein the optical fiber is held by an optical fiber block and the pair of lenses are provided on the opposed surfaces of a lens block, wherein the optical fiber block and the lens block are united together.

5. The optical module unit according to claim 4, wherein in the opposed surfaces of the lens block to which the lenses are provided, the surface of the lens block opposed to the side to which the optical fiber is united is not perpendicular to the optical axis, but inclined thereto.

6. The optical module unit according to claim 4, wherein the lens is a refractive index distribution type lens with refractive index distribution of a substantially hemispheric shape.

7. The optical module unit according to claim 4, wherein the lens is a diffraction type lens.

8. The optical module unit according to claim 4, wherein the lens is formed by filling high refractive index resin into a substantially hemispheric depression provided on the lens block.

9. The optical module unit according to claim 1, wherein the optical fiber is held by the optical fiber block and one of the pair of lenses is formed as a convex lens on one side of the optical fiber block by a 2 photopolymer molding method, while the other of the pair of lenses is formed on the surface of the lens block opposed to the remote side the thereof, and wherein the optical fiber block and the lens block are united together.

10. The optical module unit according to claim 1, wherein at least one of the opposed-lenses is provided wish an off-axis aberration correcting means.

11. The optical module unit according to claim 10, wherein the off-axis aberration correcting means is an astigmatism application means for denying the astigmatism.

12. The optical module unit according to claim 10, wherein the off-axis aberration correcting means is made oval when the lens is seen from the optical axis.

13. An optical module comprising a pair of optical module units and an optically functional member disposed between the optical module units, wherein the optical module units are ones according to claim 1, characterized in that the optically functional member is a wavelength division element.

14. The optical module according to claim 13, wherein the wavelength division element is an optical multi-layer film or diffraction grating.

15. An optical module comprising a pair of optical module units and an optically functional element disposed between the optical module units, wherein the optical module units are ones according to claim 1, characterized in that the optically functional member is a transmission/reflection change-over switch element.

16. The optical module according to claim 15, wherein the switch element is a laminated film of which the refractive index is electrically changed.

17. An optical module having diffraction grating provided on the surface of the optical module unit according to claim 1 opposed to a side to which the optical fiber is connected.

* * * * *